Patented Jan. 2, 1945

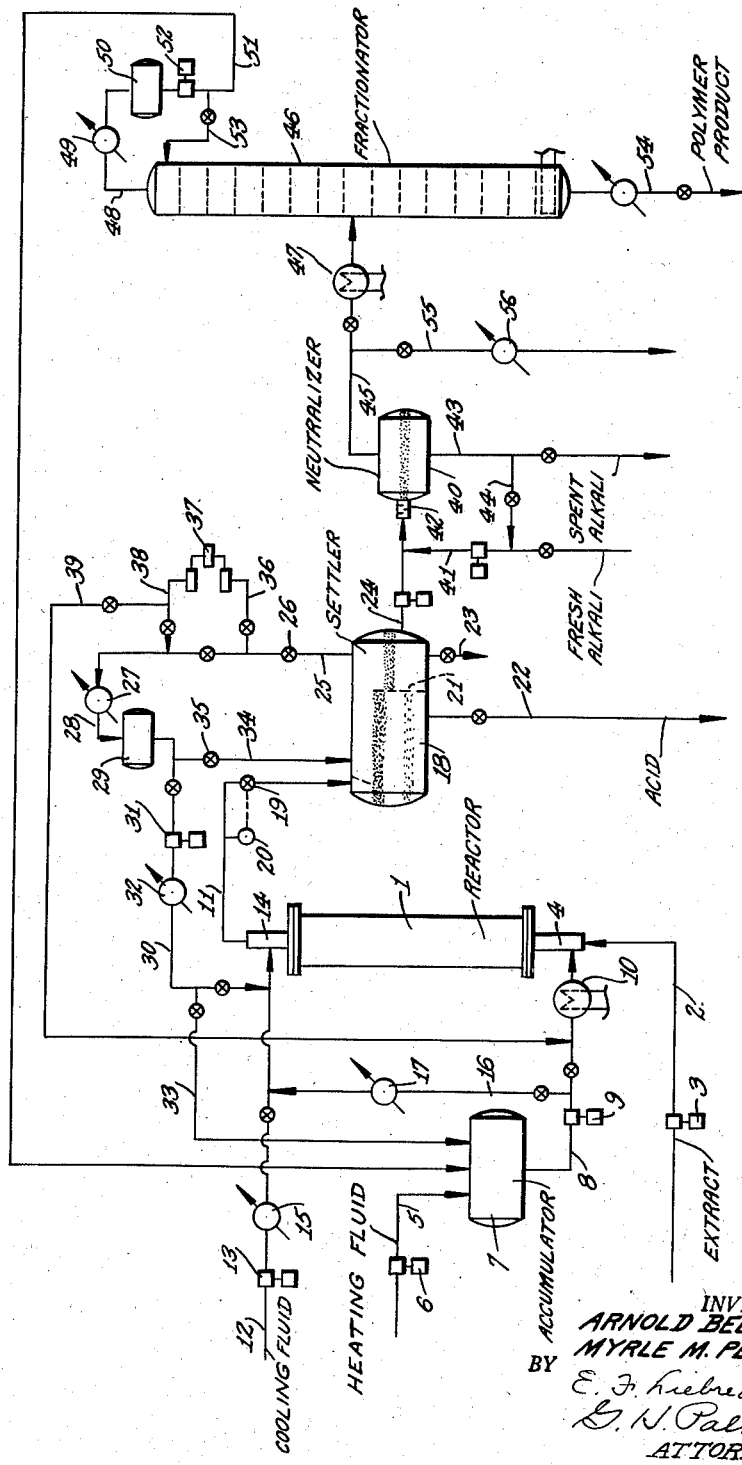

2,366,171

UNITED STATES PATENT OFFICE 2,366,171

HYDROCARBON CONVERSION

Arnold Belchetz, Larchmont, and Myrle M. Perkins, Plandome, N. Y., assignors to The M. W. Kellogg Company, Jersey City, N. J., a corporation of Delaware Application October 22, 1942, Serial No. 463,012

9 Claims. (Cl. 260—683.1)

This invention relates to improvements in the production of olefin polymers. More particularly, the invention relates to improvements in the process in which olefin hydrocarbons are first absorbed in a liquid acid polymerizing catalyst and the extract is then heated to polymerize the absorbed olefins.

Olefin hydrocarbons may be absorbed at relatively low temperatures in liquid acid polymerizing catalysts such as sulfuric acid or hydrofluoric acid, and the absorbed olefins may then be polymerized by heating the extract to a suitable polymerizing temperature. The principal commercial use of this process is the "cold acid" polymerization of isobutylene. In this process isobutylene is absorbed in sulfuric acid of suitable concentration at relatively low temperature, and the extract is then heated to a suitable polymerizing temperature to separate the absorbed hydrocarbons as polymers and regenerate the acid catalyst. Iso-olefins such as isobutylene are more readily absorbed by the acid catalyst than normal olefins, so that by maintaining contact of the acid and the olefins at relatively low temperature and by limiting the time of contact the iso-olefins such as isobutylene may be absorbed selectively from a hydrocarbon mixture containing normal olefins such as normal butylenes.

After the extraction step the olefin-acid extract is separated from any unabsorbed hydrocarbons which may be present, and the extract is then treated to polymerize the olefins and regenerate the acid. This may be done by heating the extract to a temperature sufficiently high to polymerize the absorbed olefins. In previous commercial practice the polymerization has been affected by passing the extract through externally heated coils consisting of copper or steel or lead. Since such coils have relatively short life due to the corrosive effect of the heated extract and require frequent replacement, it is preferred in carrying out the improved process to heat the extract to the polymerizing temperature by mixing it with a heated fluid and passing the mixture through an elongated reaction chamber of substantial cross-sectional area. Such a reactor may be lead lined and acid-brick lined and filled with suitable acid resistant packing such as ceramic Raschig rings. In such an apparatus problems of corrosion and erosion are substantially eliminated.

The extract is heated to the selected polymerizing temperature by admixing with it the requisite quantity of the hot fluid. The heating fluid selected preferably is one which may be vaporized prior to contact with the extract and which is condensed by contact with the extract, whereby the heat necessary to raise the temperature of the extract to the polymerizing temperature is supplied at least in part by the heat of condensation of the heating fluid. Preferably also the heating fluid selected is one which will not produce undesirable by-products by reaction with itself or the olefin reactants or the acid catalyst. Low-boiling saturated paraffin hydrocarbons such as the butanes are advantageous heating fluids because of their relative inertness. However, low-boiling olefin hydrocarbons such as the butylenes may be employed if the polymer products produced by the reaction of such olefin heating fluids are tolerable in the polymer product of the process. The selection of a suitable heating fluid is not limited, however, to hydrocarbons, as any suitable fluid may be used which does not form undesired reaction products. Suitable heating fluids other than hydrocarbons which may be employed include the ethers, such as dimethyl ether and diethyl ether, and alkyl chlorides, such as methyl chloride and ethyl chloride.

In the polymerization of olefin hydrocarbons it is desired ordinarily to operate under conditions which promote the formation of dimers and minimize the production of trimers and quadrimers. For example, in the polymerization of isobutylene to form di-isobutylene for hydrogenation to iso-octane it is desirable to operate under conditions which minimize the formation of polymers other than dimers. Furthermore, dimers are preferable to trimers in a polymer feed for an alkylation process since the consumption of acid in the alkylation process is lower when alkylating dimers than when alkylating trimers. It is desirable, therefore, to heat the extract rapidly to the polymerizing temperature at which the production of dimers rather than trimers is favored, limit the holding time at that polymerizing temperature to that necessary to effect maximum formation of dimers and then quickly lower the temperature of the reaction mixture to the point at which polymerization is substantially inhibited. Rapid cooling of the reaction mixture emerging from the reaction zone is desirable also to cool the acid to a temperature low enough to minimize corrosion in the equipment through which the acid passes subsequently to its emergence from the reaction zone.

In accordance with the present invention rapid cooling of the reaction mixture in a manner which involves the least contact of the hot acid with apparatus subject to corrosion is effected by incorporating in the reaction mixture a liquefied fluid which is lower boiling than the polymer product and then releasing the pressure on the mixture to permit vaporization of at least a portion of the liquefied fluid so that the unvaporized remainder of the mixture is cooled to a relatively low temperature. The liquefied low-boiling fluid may be admixed with the reaction mixture as it emerges from the reaction zone or may be incorporated in the reaction mixture prior to the entrance thereof into the reaction zone or during passage of the reaction mixture through the reaction zone. The vaporized fluid is separated from the unvaporized remainder, and the vapors are liquefied and returned for further use in the process.

The liquefied fluid which is admixed with the reaction mixture should be substantially lower boiling than the desired polymer product in order to minimize vaporization of the latter when the pressure on the mixture is released. The liquefied fluid preferably is admixed with the hot reaction mixture emerging from the reaction zone while at a relatively low temperature in order to effect a preliminary quenching of the mixture prior to the release of the pressure.

Preferably, a liquefied cooling fluid is selected which has boiling characteristics generally similar to those of the olefins absorbed in the extract. The pressure on the reaction zone ordinarily is maintained sufficiently high to prevent vaporization of the absorbed olefins which may be regenerated from the extract by the polymerizing temperature. Therefore, the use of a cooling fluid of boiling characteristics similar to those of the absorbed olefins is advantageous since it does not require the application of a higher pressure on the reaction zone to permit mixing the liquefied cooling fluid and the reaction mixture in the liquid phase. This relationship in boiling characteristics is not essential, however, since any liquefied cooling fluid may be used under conditions which permit mixing of the liquefied fluid and the liquid reaction mixture followed by vaporization of the liquefied cooling fluid upon releasing the pressure on the mixture.

Ordinarily, a substantially non-reactive material is preferred for use as the liquefied cooling fluid. For example, low boiling paraffin hydrocarbons such as propane, the butanes and the pentanes are preferred. Higher boiling paraffin hydrocarbons are satisfactory if the boiling point of the polymer product is sufficiently high to permit separate vaporization of the cooling fluid. Lower boiling paraffin hydrocarbons require the application of a very high pressure to effect their liquefaction. Low-boiling olefin hydrocarbons are satisfactory also if the polymer products which they may form may be tolerated in the product of the process. Liquefied fluids other than hydrocarbons may be employed also such as dimethyl and diethyl ether and methyl and ethyl chloride.

Conveniently, the material employed as the liquefied cooling fluid may be identical with material employed to heat the extract to the reaction temperature. For example, in the polymerization of isobutylene the extract may be heated to the reaction temperature by mixing therewith vaporized isobutane in such proportions as to produce a resulting liquid mixture at the desired polymerizing reaction temperature. After the emergence of the resulting reaction mixture from the reaction zone, and with or without the addition thereto of additional quantities of isobutane the pressure may be released to permit vaporization of a substantial proportion of the isobutane in the mixture to effect cooling of the remainder of the mixture. Conveniently, vapors thus obtained are condensed, and condensate thus obtained is admixed with the reaction mixture emerging from the reaction zone prior to the release of the pressure to quench the reaction mixture to a lower temperature. In carrying out the process of the invention in connection with a polymerization operation employing a liquefied heating fluid it is advantageous to employ a similar material as the cooling fluid in the manner just described to avoid introducing the multiplicity of different materials into the reaction mixture.

The invention will be described in more detail by reference to a specific application of the invention to "cold acid" polymerization of isobutylene. It is to be understood, however, that the invention is not limited to processes involving polymerization of iso-olefins but includes within its scope the polymerization of any olefin hydrocarbon having the same or a greater or less number of carbon atoms per molecule and is applicable also to the polymerization of olefins other than iso-olefins such as normal olefins and di-olefins.

In the further description of the invention reference will be made to the use of sulfuric acid as the liquid acid polymerizing catalyst. It is to be understood, however, that the invention is not limited to the use of this specific catalytic agent but is applicable to processes employing other liquid acid catalysts, such as hydrofluoric acid.

In the further description of the invention reference will be made by way of example to the accompanying drawing which illustrates diagrammatically an assemblage of apparatus for carrying out the specific application of the invention to a process involving the polymerization of isobutylene. It is to be understood, however, that the invention is not limited by reference to a specific assemblage of apparatus since the principles of operation illustrated are applicable to the polymerization of other olefins by means of other combinations of apparatus and operating steps and by means of liquid polymerizing catalysts and operating conditions other than those referred to specifically. The invention will be described also by reference to its preferred modification in which polymerization of the absorbed olefins is effected by mixing with the extract a vaporized heating fluid which forms with the extract a resulting fluid mixture at the desired polymerizing temperature. In this preferred modification of the invention a material similar to the heating fluid is employed as the cooling fluid in the manner described above. The invention, however, is not limited in its application to polymerization processes in which the extract is heated to the polymerizing temperature in the manner described nor is it limited to the use of cooling fluids similar in composition to materials which may be employed in the polymerization step as heating fluids.

Referring to the drawing, the polymerization process is carried out in reactor 1 which is an elongated lead-lined acid-brick lined cylindrical vessel adapted to withstand the application of substantial pressure. Preferably, reactor 1 is filled with some suitable acid-resistant packing such as ceramic Raschig rings.

The acid-isobutylene extract is supplied to the operation through line 2, which is provided with a pump 3, by which the extract is introduced into one end of a lead-lined mixing nozzle 4 which communicates at its other end with the interior of reactor 1.

The heating fluid is introduced into the system through line 5, provided with a pump 6, which connects with accumulator 7. From accumulator 7 heating fluid is withdrawn through line 8, provided with pump 9, and introduced into mixing nozzle 4 at a point adjacent the point of introduction of the extract through line 2. Heating means 10 is provided in line 8 to heat the heating fluid introduced into nozzle 4 to vaporize it and superheat it to the desired degree.

The heating fluids which are most suitable for use in the polymerization of isobutylene are isobutane and normal butane. Normal butane may be used without the maintenance of a higher pressure on reactor 1 than would be required to prevent vaporization of isobutylene, but, on the other hand, it requires heating to a higher temperature at 10 to vaporize it than does isobutane. Furthermore, if it is desired to employ the isobutylene polymer product as charging stock to an alkylation operation, the use of isobutane as the heating fluid is advantageous since its presence in the polymer product does no require fractionation of the product prior to charging the polymer to the alkylation process. In accordance with this specific example, therefore, isobutane is accumulated at 7 and charged into mixing nozzle 4 at the desired rate after having been vaporized at 10.

The amount of isobutane required for polymerizing each unit of isobutylene charged to the system in the extract through line 2 increases as the concentration of isobutylene in the extract decreases. The molar ratio of $H_2SO_4$ to $C_4H_8$ in the extract may vary from 0.5:1.0 to 4.0:1.0. Preferred methods of extraction of isobutylene for the polymerization step ordinarily result in supplying to the latter an extract in which the molar ratio of $H_2SO_4$ to $C_4H_8$ is in the range of 0.7:1.0 to 1.0:1.0. Higher ratios of acid to isobutane increase the heat requirement of the polymerization step substantially and lower the efficiency of the extraction operation in extracting isobutylene in preference to the normal butanes.

It is preferred ordinarily to maintain the polymerization zone at a temperature within the range of 150° to 230° F. to achieve complete regeneration of the acid and to avoid temperatures high enough to decompose the acid. The preferred range is 170° to 210° F. within which the higher temperatures apparently favor rapid polymerization with the formation of a high proportion of dimers.

The use of isobutane requires the application of pressure on the polymerization reactor sufficiently high to prevent vaporization of isobutane at the reaction temperature. While the vapor pressure of the reaction mixture is substantially lower than the vapor pressure of the isobutane contained therein, because of the presence in the mixture of lower boiling materials such as polymers and isobutylene, the vapor pressure of isobutane, which varies from 170 pounds per square inch (gauge) at 170° F. to 275 pounds per square inch (gauge) at 210° F., is a satisfactory minimum pressure for use in the reactor. If normal butane were to be employed as the heating fluid somewhat lower pressures could be employed in the reactor since isobutylene would be the lowest boiling constituent of the mixture. Preferably, the pressure on the reactor is maintained somewhat above the indicated minimum. When using isobutane as the heat fluid the operating pressure should vary from 200 pounds per square inch (gauge) at 170° F. to 300 pounds per square inch (gauge) at 210° F.

The amount of isobutane which must be injected into mixing nozzle 4 to polymerize a unit quantity of isobutylene introduced therein from line 2 is affected by the concentration of isobutylene in the extract, the temperature of the extract, the polymerizing temperature selected and the temperature of the vaporized isobutane introduced into the mixing nozzle 4 through line 8. The heat made available to the polymerization reaction by the vaporized isobutane is the latent heat of condensation at the operating pressure, the sensible heat of the isobutane vapors resulting from the superheating of the vapors and the sensible heat of the condensed isobutane.

The variation in the quantity of isobutane required for various operating conditions and various concentrations of isobutane in the extract when the extract flowing through line 2 is supplied to mixing nozzle 4 at 95° F. and when vaporized isobutane is supplied to mixing nozzle 4 at a temperature of 300° F. may be summarized in the following table:

|  | Mol ratio of $H_2SO_4:C_4H_8$ in extract | |
|---|---|---|
|  | 0.75:1.0 | 1.0:1.0 |
| Polymerization temperature _____ ° F__ | 175   210 | 175   210 |
| Polymerization pressure pounds per square inch (gauge)__ | 200   300 | 200   300 |
| Heat available per pound isobutane B. t. u__ | 185   150 | 185   150 |
| Pounds of isobutane required to polymerize each pound of isobutylene to di-isobutylene_____ | 1.23   1.89 | 1.45   2.28 |

The vaporized isobutane and extract are intimately mixed in mixing nozzle 4 to form a liquid mixture at the preselected reaction temperature. The reaction mixture then flows through reactor 1 at a rate which provides the holding time necessary to effect the desired polymerization of isobutylene. 15 minutes ordinarily is the maximum holding time necessary and 3 to 5 minutes ordinarily is sufficient. The temperature of the reaction mixture flowing through the reaction zone is substantially uniform as the endothermic reactions by which the tertiary butyl alcohol and tertiary butyl esters are converted to polymer is balanced by the exothermic polymerization of isobutylene which is released from the mixture by the heating of the extract to the reaction temperature.

The introduction of a large proportion of a low-boiling fluid such as isobutane into the reaction mixture at 4 as a heating fluid and the subsequent condensation of this material by contact with the extract is one method of incorporating in the reaction mixture a substantial proportion of a low-boiling fluid which may be evaporated from the reaction mixture emerging from the reaction zone to cool the remaining unvaporized portion of the reaction mixture. For example, the reaction mixture emerging from reactor 1 through line 11 may have the pressure thereon substantially reduced in order to permit evaporation of a substantial proportion of the isobutane. It is preferred, however, to subject the reaction mixture emerging from reactor 1 to a preliminary quench by means of a low-boiling cooling fluid introduced into the system through line 12, provided with a pump 13. A mixing nozzle 14 is interposed between reactor 1 and line 11, and line 12 connects suitably with mixing nozzle 14 whereby cooling fluid introduced therethrough is intimately mixed with the reaction mixture emerging from reactor 1. Cooling means 15 may be provided for chilling the cooling fluid as desired to effect the desired degree of cooling in the reaction mixture at 14.

Conveniently, the cooling fluid introduced through line 12 consists essentially of isobutane in order that material introduced through line 12 shall be substantially the same in composition as the heating fluid introduced through line 8 in order to restrict the number of different materials introduced into the system. If isobutane is employed as the cooling fluid it may be supplied from accumulator 7 by means of line 16 which connects line 8 and line 12. Cooling means 17 may be provided in line 16 for chilling isobutane passing through line 16 to the desired degree.

Line 11 connects with a settler 18 in which the acid and polymer are to be separated into an upper, hydrocarbon, phase and a lower or acid phase. In order to cool the reaction mixture to a lower temperature in settler 18 and thus minimize corrosion difficulties a pressure control valve 19, associated with automatic control means 20, is located in line 11 to reduce the pressure on the mixture passing through line 11 to a substantial degree. For example the pressure on the reaction mixture may be reduced from a reaction pressure of 300 pounds per square inch (gauge) to a pressure of 50 pounds per square inch (gauge) in settler 18. The pressure in settler 18 may be varied to control the temperature therein in response to variations in quantity and temperature of the reaction mixture and cooling fluid employed.

The quantity of isobutane introduced at 14 through line 12 and the temperature thereof are regulated whereby the reduction in pressure on the reaction mixture at 19 permits sufficient evaporation of isobutane to produce a temperature in the settler not substantially greater than 150° F., preferably reduction of the temperature to 110° F. should be attained. Ordinarily, the quantity of isobutane introduced through line 11 at 90° F. to accomplish this result is the same order of magnitude as the quantity of isobutane introduced at 4 through line 8 at 300° F. Necessarily, this is an approximation since the exact quantities required depend upon many factors.

In settler 18 the unvaporized liquids separate into an upper or hydrocarbon phase and a lower or acid phase in the portion of the settler to the left of baffle 21. The acid phase is withdrawn through line 22 for return to the absorption step. The hydrocarbons flow over baffle 21 to the other section of settler 18. In this smaller section of settler 18 further separation of the hydrocarbon mixture from residual acid is effected, the latter being withdrawn through line 23. The hydrocarbons are withdrawn through line 24.

The isobutane vapors which are liberated by the release of the pressure on the reaction mixture at 19 with accompanying cooling of the reaction mixture are withdrawn overhead from settler 18 through line 25 which is provided with a valve 26 for controlling the pressure on settler 18. Line 25 connects with cooling means 27 by means of which the isobutane vapors are cooled sufficiently to condense them. Condensate thus obtained is transferred from condenser 27 through line 28 to a surge drum 29 in which the condensate is collected.

The isobutane condensate collected at 29 preferably is returned for reuse through line 30 which connects surge drum 29 with line 12 whereby condensate obtained at 29 is employed as a quench medium at 14. Line 30 is provided if necessary with a pump 31 and cooling means 32, the latter being provided to effect any desired chilling of the condensate prior to its use as quench medium at 14.

All or a portion of the isobutane condensate flowing through line 30 may be diverted therefrom through line 33 which connects line 30 with accumulator 7.

As a further alternative method of operation all or a portion of the condensate collected at 29 may be returned directly to settler 18 through line 34 which connects line 30 with settler 18. Line 34 is provided if necessary with a valve 35. It is more advantageous, however, to pump the condensate at 29 up to the pressure of reactor 1 and employ it as the quench medium at 14.

As a further modification of the invention the vapors withdrawn from settler 18 through line 25 may be diverted therefrom through line 36 which connects with a compressor 37 by means of which the vapors are recompressed to the polymerization reaction pressure. The outlet of compressor 37 is connected to line 25 by means of line 38 so that the resulting mixture of condensate and vapors is passed to cooling means 27 for further cooling therein to complete liquefaction of the isobutane. The isobutane condensate at 29 then may be transferred to mixing nozzle 14 or accumulator 7 without substantial increase in the pressure thereon. This method of condensing the vapors withdrawn from settler 18 is advantageous in that it permits cooling at 27 by means of cooling water and does not require refrigeration at that point.

In accordance with a further modification of the process the heat requirements are still further reduced by transferring the recompressed isobutane emerging from the outlet of compressor 37 to the inlet of heating means 10 by means of line 39 which connects line 38 with line 8. By this means the heat withdrawn from the reaction mixture by vaporization of isobutane is partially recovered by utilizing the recompressed vapors for supplying a portion of the heat required for the polymerization treatment of the extract. In this method of operation the isobutane required as heating fluid would be supplied substantially entirely through line 39, while additional isobutane for cooling means would be supplied through line 12 either from accumulator 7 by way of line 16 or from an external source.

The hydrocarbon mixture, including polymer and isobutane, withdrawn from settler 18 through line 24, is then introduced into neutralizer 40. Alkali introduced through line 41, which connects with line 24, is intimately mixed with the hydrocarbon mixture in mixer 42 to effect neutralization of any acid retained by the hydrocarbon mixture. In neutralizer 40 the mixture is permitted to separate into an upper or hydrocarbon phase and a lower or alkali phase. Spent alkali is withdrawn from neutralizer 40 through line 43. If desired a portion of the spent alkali may be recirculated for reuse through line 44 which connects lines 43 and 41.

The neutralized hydrocarbon mixture is withdrawn overhead from neutralizer 40 through line 45 which connects with fractionator 46. Heating means 47 may be provided to preheat the hydrocarbon mixture prior to its entry into fractionator 46. In fractionator 46 the hydrocarbon mixture is subjected to fractionating conditions adapted to separate overhead the isobutane contained therein as well as accompanying materials of similar boiling characteristics such as unconverted isobutylene. This material passes overhead from fractionator 46 through line 48 which is provided with condensing means 49 and which connects with accumulator 50. From accumulator 50 the condensed isobutane is withdrawn through line 51 provided with pump 52. Line 51 connects with accumulator 7 whereby the isobutane flowing therethrough is returned for reuse as heating fluid or cooling fluid. A portion of the condensate flowing through line 51 may be diverted through line 53 and returned to the upper portion of fractionator 46 as reflux.

The polymer product of the process is withdrawn from the lower portion of fractionator 46 through line 54 for further handling. This material may be used directly as an ingredient of motor fuel but preferably is hydrogenated prior to such use. This material also may be employed as feed stock for an alkylation process.

If the polymer product is to be employed in an alkylation process and if isobutane is employed as the heating and cooling fluid in the polymerization process it may be desirable to eliminate the fractionation step carried out at 46. All or a portion of the material flowing through line 45 may be diverted therefrom through line 55 for passage directly to an alkylation reactor. Cooling means 56 may be provided in line 55 to reduce the temperature of the mixture to that of the alkylation reaction. When operating in this manner the isobutane required for heating and quenching in the polymerization process may be recovered from the alkylation process as a portion of the isobutane normally recycled in that process.

When the process of this invention is employed to separate isobutylene from the fresh feed to a process for making butadiene, the succeeding stages of the later process may furnish a hydrocarbon mixture which is suitable for use both as a heating fluid and as the cooling fluid. After treatment of a gaseous hydrocarbon mixture essentially consisting of C4 hydrocarbons and including iso-olefins and normal olefins, to effect substantial removal of iso-olefins, the remaining unabsorbed hydrocarbon mixture may be then subjected to a further extraction treatment, for example with acetone, to separate olefins from paraffins. The unabsorbed paraffin mixture from such a treatment ordinarily consists of a mixture of butanes in proportions of isobutane and normal butane which depend upon the character of the process in which the gas mixture is formed. If the original feed is obtained by thermal cracking of hydrocarbon oils the butane mixture is found to predominate in normal butane, whereas if a catalytic hydrocarbon oil process is the source of the gas mixture the butanes predominate in isobutane. In either case this material may be used as the heating fluid and as the cooling fluid in the present process.

Ordinarily, the mixture of normal butane and isobutane remaining after the extraction of olefins contains a trace of isobutylene and a few per cent of normal butylenes. The presence of these olefins in the heating fluid and the cooling fluid is not objectionable, however, since any reaction by them results in the formation of polymers which are included in the polymer product. The presence of the polymers of such olefins in the polymer product is unobjectionable if the latter is to be supplied as fresh feed to an alkylation process. If the polymer is to be hydrogenated to iso-octane the presence of a small proportion of normal butenes in the reaction zone is not objectionable for the reason that the high proportion of isobutylene in the reaction zone will result in cross-polymerization of the normal butylenes with isobutylene with the formation of octanes which can be hydrogenated to a product of high octane number. The use of a gas mixture from this source as the heating fluid and as the cooling fluid in this process is particularly advantageous if the gases are obtained originally from a catalytic process and if the polymer product is to be employed as fresh feed to an alkylation process since, as pointed out above, such a mixture predominates in iso-butane.

We claim:

1. In the method of producing olefin polymers in which olefin hydrocarbons are absorbed in a liquid acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures and at a substantially superatmospheric polymerizing pressure with vapors of a hydrocarbon, boiling above the polymerizing temperature at said pressure, in proportions which produce a resulting mixture of extract and condensed vapors which is at the desired polymerizing temperature, permitting polymerization to proceed to the desired degree, and then lowering the pressure on said reaction mixture to permit vaporization of at least a portion of said condensed hydrocarbon to cool the unvaporized remainder of said reaction mixture to a relatively low temperature at which further polymerization is inhibited.

2. In the method of producing olefin polymers in which olefin hydrocarbons are absorbed in a liquid acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures and at a substantially superatmospheric polymerizing pressure with vapors of a hydrocarbon, boiling above the polymerizing temperature at said pressure but not substantially lower than said absorbed olefin hydrocarbons, in proportions which produce a resulting mixture of extract and condensed vapors which is at the desired polymerizing temperature, permitting polymerization to proceed to the desired degree, and then lowering the pressure on said reaction mixture to permit vaporization of at least a portion of said condensed hydrocarbon to cool the unvaporized remainder of said reaction mixture to a relatively low temperature at which further polymerization is inhibited.

3. In the method of producing olefin polymers in which olefin hydrocarbons are absorbed in a liquid acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures and at a substantially superatmospheric polymerizing pressure with vapors of a hydrocarbon, boiling above the polymerizing temperature at said pressure, in proportions which produce a resulting mixture of extract and condensed vapors which is at the desired polymerizing temperature, permitting polymerization to proceed to the desired degree, then admixing with the reaction mixture a further quantity of said hydrocarbon in a liquid condition, and then lowering the pressure on said reaction mixture to permit vaporization of at least a portion of said condensed hydrocarbon to cool the unvaporized remainder of said reaction mixture to a relatively low temperature at which further polymerization is inhibited.

4. In the method of producing olefin polymers in which olefin hydrocarbons are absorbed in a liquid acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures and at a substantially superatmospheric polymerizing pressure with vapors of a hydrocarbon, boiling above the polymerizing temperature at said pressure, in proportions which produce a resulting mixture of extract and condensed vapors which is at the desired polymerizing temperature, permitting polymerization to proceed to the desired degree, then admixing with the reaction mixture a further quantity of said hydrocarbon in a liquid condition, then lowering the pressure on said reaction mixture to permit vaporization of at least a portion of said condensed hydrocarbon to cool the unvaporized remainder of said reaction mixture to a relatively low temperature at which further polymerization is inhibited, condensing vapors thus obtained, and readmixing liquid recovered by said condensation step with the reaction mixture as described.

5. In the method of producing butene polymers in which butene is absorbed in a liquid acid polymerizing catalyst at temperatures below polymerizing temperatures and the extract thus obtained is heated under pressure to a temperature below the boiling point of butane at the polymerizing pressure but sufficiently high to polymerize the absorbed butene in the liquid phase, the improvement which comprises mixing said extract while at a temperature below polymerizing temperatures and at a substantially superatmospheric polymerizing pressure with butane vapors in proportions which produce a resulting mixture of extract and condensed butane which is at the desired polymerizing temperature, permitting polymerization of butene to proceed to the desired degree, and then lowering the pressure on the reaction mixture to permit vaporization of at least a portion of the liquefied butane content of the reaction mixture to cool the unvaporized remainder of the reaction mixture to a relatively low temperature at which further polymerization is inhibited.

6. In the method of producing isobutylene polymers in which isobutylene is absorbed in a liquid acid polymerizing catalyst at temperatures below polymerizing temperatures and the extract thus obtained is heated under pressure to a temperature below the boiling point of isobutane at the polymerizing pressure but sufficiently high to polymerize the absorbed isobutylene in the liquid phase, the improvement which comprises mixing said extract while at a temperature below polymerizing temperatures and at a substantially superatmospheric polymerizing pressure with isobutane vapors in proportions which produce a resulting mixture of extract and condensed isobutane which is at the desired polymerizing temperature, permitting polymerization of isobutylene to proceed to the desired degree, and then lowering the pressure on the reaction mixture to permit vaporization of at least a portion of the liquefied isobutane content of the reaction mixture to cool the unvaporized remainder of the reaction mixture to a relatively low temperature at which further polymerization is inhibited.

7. In the method of producing isobutylene polymers in which isobutylene is absorbed in a liquid acid polymerizing catalyst at temperatures below polymerizing temperatures and the extract thus obtained is heated under pressure to a temperature below the boiling point of isobutane at the polymerizing pressure but sufficiently high to polymerize the absorbed isobutylene in the liquid phase, the improvement which comprises mixing said extract while at a temperature below polymerizing temperatures and at a substantially superatmospheric polymerizing pressure with isobutane vapors in proportions which produce a resulting mixture of extract and condensed isobutane which is at the desired polymerizing temperature, permitting polymerization of isobutylene to proceed to the desired degree, then admixing with said reaction mixture a further quantity of said isobutane in the liquid condition, and then lowering the pressure on the reaction mixture to permit vaporization of at least a portion of the liquefied isobutane content of the reaction mixture to cool the unvaporized remainder of the reaction mixture to a relatively low temperature at which further polymerization is inhibited.

8. In the method of producing isobutylene polymers in which isobutylene is absorbed in a liquid acid polymerizing catalyst at temperatures below polymerizing temperatures and the extract thus obtained is heated under pressure to a temperature below the boiling point of isobutane at the polymerizing pressure but sufficiently high to polymerize the absorbed isobutylene in the liquid phase, the improvement which comprises mixing said extract while at a temperature below polymerizing temperatures and at a substantially superatmospheric polymerizing pressure with isobutane vapors in proportions which produce a resulting mixture of extract and condensed isobutane which is at the desired polymerizing temperature, permitting polymerization of isobutylene to proceed to the desired degree, then admixing with said reaction mixture a further quantity of said isobutane in the liquid condition, then lowering the pressure on the reaction mixture to permit vaporization of at least a portion of the liquefied isobutane content of the reaction mixture to cool the unvaporized remainder of the reaction mixture to a relatively low temperature at which further polymerization is inhibited, condensing vaporized isobutane thus obtained, and readmixing liquefied isobutane thus recovered with said reaction mixture after polymerization as described.

9. In the method of producing isobutylene polymers in which isobutylene is absorbed in a liquid sulphuric acid polymerizing catalyst at temperatures below polymerizing temperatures and the extract thus obtained is heated under pressure to a temperature below the boiling point of isobutane at the polymerizing pressure but sufficiently high to polymerize the absorbed isobutylene in the liquid phase, the improvement which comprises mixing said extract while at a temperature below polymerizing temperatures and at a substantially superatmospheric polymerizing pressure with isobutane vapors in proportions which produce a resulting mixture of extract and condensed isobutane which is at the desired polymerizing temperature, permitting polymerization of isobutylene to proceed to the desired degree, then admixing with said reaction mixture a further quantity of said isobutane in the liquid condition, then lowering the pressure on the reaction mixture to permit vaporization of at least a portion of the liquefiid isobutane content of the reaction mixture to cool the unvaporized remainder of the reaction mixture to a relatively low temperature at which further polymerization is inhibited, condensing vaporized isobutane thus obtained, and readmixing liquefied isobutane thus recovered with said reaction mixture after polymerization as described.

ARNOLD BELCHETZ.
MYRLE M. PERKINS.